June 3, 1969
F. SCHLEGEL
3,447,861
WIDE ANGLE OBJECTIVE
Filed July 19, 1966
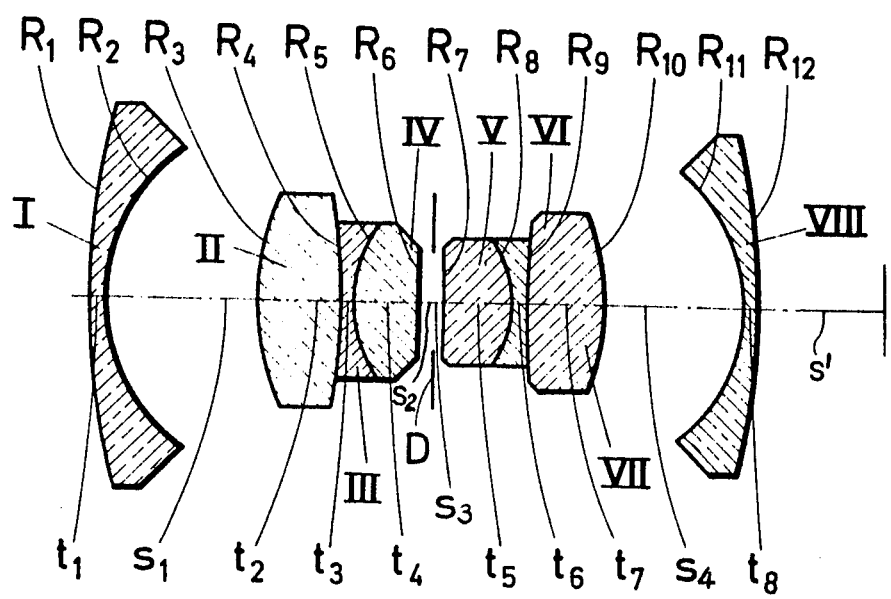
INVENTOR.
FRANZ SCHLEGEL
BY Low and Berman
AGENTS

United States Patent Office 3,447,861
Patented June 3, 1969

3,447,861
WIDE ANGLE OBJECTIVE
Franz Schlegel, Munich, Germany, assignor to Optische Werke G. Rodenstock, Munich, Germany
Filed July 19, 1966, Ser. No. 567,330
Claims priority, application Germany, Aug. 19, 1965, O 11,075
Int. Cl. G02b 9/34
U.S. Cl. 350—220          1 Claim

ABSTRACT OF THE DISCLOSURE

A wide-angle objective of the modified symmetrical type has two outer, negative meniscus lenses made of the same crown glass having abnormal dispersion characteristics, and two cemented triplets air spaced from each other and from the meniscus lenses. The refractive indices of the glasses used in the triplets increase in an outward direction. The middle glass of each triplet is an asymmetrical biconcave lens made of telescope flint. Specific data are given.

---

This invention relates to photographic objectives, and particularly to an improved wide angle objective having a total angle of view of at least 75° and being of the type in which cemented positive components are arranged in front and behind the stop, and are each air spaced from a negative meniscus lens.

It is important that the extraaxial aberrations of such objectives be adequately corrected, such as field curvature and astigmatism, but particularly distortion, coma, and chromatic aberration. It is difficult to achieve such correction free from zonal effects over the entire angle of view. The three last-mentioned types of aberration are known to be capable of being corrected for an object-to-image ratio of 1:1 by perfect symmetry of the objective.

It is not permissible to make such a lens system precisely symmetrical, but it must be modified in such a manner that optimum correction is achieved for the image of a very remote object in the focal plane. The asymmetry in the design of the lens system must be limited so that the residual zonal components of the afore-mentioned aberrations remain small. The shape of the two meniscus lenses has an important influence on these aberrations, and the meniscus lenses are made not only of closely similar refractive power, but also of the same glass so that the chromatic aberrations of higher order are limited.

According to a first important feature of this invention, the two substantially identical meniscus lenses are made of a crown glass whose dispersion is abnormal in that the blue portion of the spectrum is dispersed more widely than the other colors. The residual chromatic aberration caused by the geometrical asymmetry of the lens system is thereby reduced. Such glasses are commercially available, and a typical example is Schott's type FK–6.

The two positive components of the lens system on either side of the stop are cemented triplets in which the refractive indices of the individual glasses increase outward from the stop.

A second important feature of the invention resides in the fact that the middle one of the three glasses in each triplet is an asymmetrical biconcave lens so that the negative cemented faces are closely spaced on both sides of the stop. They alone provide correction of spherical aberration. Because of their close spacing, the necessary refractive power of these cemented surfaces is small, and good correction of zonal spherical aberration is achieved.

The refractive power of the positive cemented surfaces, which are remote from the stop, is relatively small. It is another feature of the invention that the numerical value of the refractive power of the positive cemented surfaces is between 5 and 25% of the numerical value of the refractive power of the negative cemented surfaces.

The dominant elements of the cemented triplets thus are the negative cemented surfaces and the air surfaces remote from the stop. They are approximately centered on the optical axis in the stop, and thus do not have any significant detrimental influence on the images of points spaced from the axis. The accumulation of large and opposite astigmatism errors is prevented.

According to a third important feature of this invention, the divergent, biconcave middle lenses of each triplet are made of telescope flint so that the secondary spectrum along the axis is eliminated or strongly reduced. Moreover, additional amounts of chromatic aberration for image points spaced from the axis which result mainly from the necessary asymmetry of the lens system are suppressed by the use of telescope flint.

Other features and the attendant advantages of this invention will become apparent to those skilled in the art as the disclosure is made of a preferred embodiment of the invention as illustrated in the accompanying drawing in which the sole figure shows a wide angle objective of the invention in section on its optical axis in a conventional manner.

The illustrated lens system has a relative aperture of 1:5.6, a total angle of view of 90°, and an equivalent focal length of 100 mm. It has two positive cemented triplets on either side of its stop D and two simple negative meniscus lenses I, VIII relatively remotely spaced from the respective triplets in a direction away from the stop. The triplets II, III, IV and V, VI, VII consist each of an asymmetrical biconcave lens III, VI cemented between two converging lenses.

The dimensional characteristics of the eight glasses of the lens system and the optical properties of the materials employed are listed in the following table.

TABLE

| Lens | Radii, mm. | Separations and Thickness, mm. | $n_E$ | $V_E$ |
|---|---|---|---|---|
| I | $R_1=+135.1$ $R_2=+33.82$ | $t_1=2.66$ $s_1=27.7$ | 1.448 | 67.2 |
| II | $R_3=+48.73$ $R_4=-119.1$ | $t_2=16.7$ | 1.723 | 50.1 |
| III | $R_5=+24.8$ | $t_3=1.95$ | 1.617 | 43.7 |
| IV | $R_6=0.00$ | $t_4=12.91$ $s_2=2.3$ $s_2+s_3=3.57$ $s_3=1.2$ | 1.520 | 51.9 |
| V | $R_7=-351$ $R_8=-20.17$ | $t_5=12.91$ | 1.527 | 64.3 |
| VI | $R_9=+257.1$ | $t_6=1.95$ | 1.617 | 43.7 |
| VII | $R_{10}=-44.30$ $R_{11}=-31.61$ | $t_7=15.4$ $s_4=27.0$ | 1.716 | 53.7 |
| VIII | $R_{12}=-132.1$ | $t_8=2.66$ $s'=61.23$ | 1.448 | 67.2 |

At least some of the advantages of the invention are obtained in a lens system whose charactericstics do not substantially differ from those indicated above.

It is necessary for best results that the two simple meniscus lenses which provide the first and last surface of the lens system consist of a glass whose Abbe number $V_E$ is greater than 65, and whose index of refraction $n_E$ is smaller than 1.46.

What is claimed is:

1. A wide angle objective comprising, in combination:
   (a) two cemented triplets defining therebetween an air space adapted to receive a stop,
      (1) each triplet consisting of two positive elements receiving a negative element of telescope flint therebetween; and
   (b) two simple meniscus-shaped negative lenses airspaced from said cemented triplets respectively in a direction away from the other cemented triplet,
      (1) said meniscus-shaped lenses each consisting of a crown glass dispersing the blue portion of the visible spectrum more widely than the other colors,
      (2) whereby said objective has eight glasses, the thicknesses $t$, separations $s$, radii of curvature $R$, refractive indices $n_E$ and Abbe number $V_E$ of said glasses being substantially as listed in the following table, the values of said thicknesses, separations, and radii being expressed in percent of the equivocal length of said objective:

TABLE

|  |  | $n_E$ | $V_E$ |
|---|---|---|---|
| $R_1=+135.1$ | $t_1=2.66$ | 1.448 | 67.2 |
| $R_2=+33.82$ | $s_1=27.7$ |  |  |
| $R_3=+48.73$ | $t_2=16.7$ | 1.723 | 50.1 |
| $R_4=-119.1$ | $t_3=1.95$ | 1.617 | 43.7 |
| $R_5=+24.8$ | $t_4=12.91$ | 1.520 | 51.9 |
| $R_6=0.00$ | $s_2+s_3=3.57$ |  |  |
| $R_7=-351$ | $t_5=12.91$ | 1.527 | 64.3 |
| $R_8=-20.17$ | $t_6=1.95$ | 1.617 | 43.7 |
| $R_9=+257.1$ | $t_7=15.4$ | 1.716 | 53.7 |
| $R_{10}=-44.30$ | $s_4=27.0$ |  |  |
| $R_{11}=-31.61$ | $t_8=2.66$ | 1.448 | 67.2 |
| $R_{12}=-132.1$ |  |  |  |

References Cited

UNITED STATES PATENTS 2,734,424   2/1956   Bertele _____ 350—215

JOHN K. CORBIN, *Primary Examiner.*